May 24, 1949. J. R. DUNN 2,470,922
WORK DISTRIBUTING CONVEYER SYSTEM
Filed Sept. 27, 1946 2 Sheets-Sheet 2
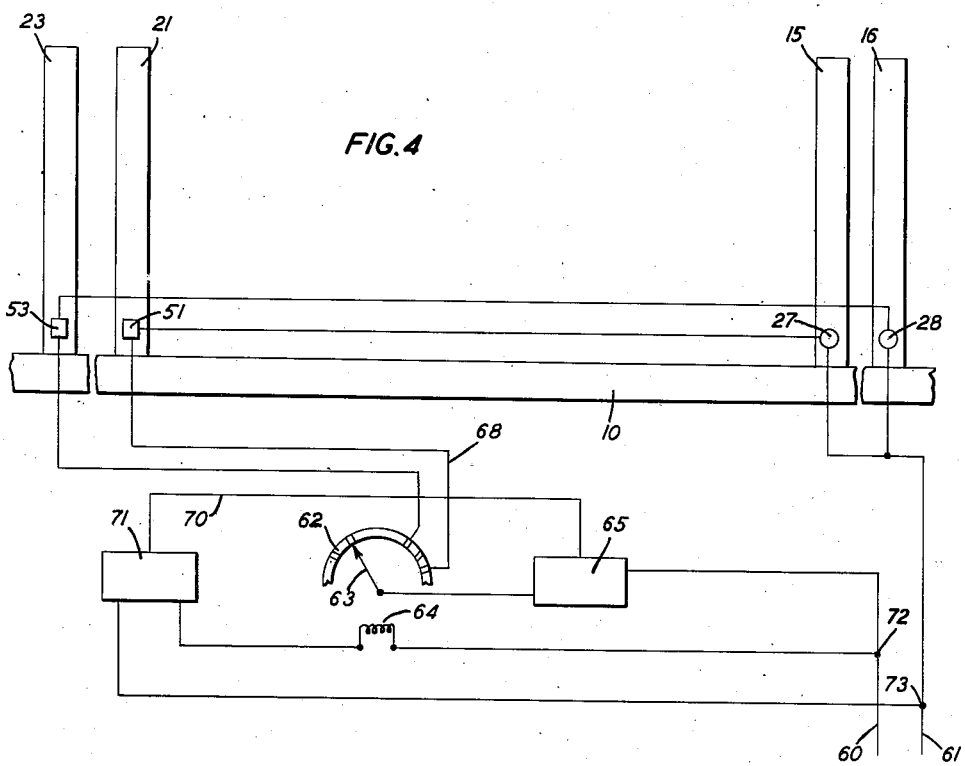
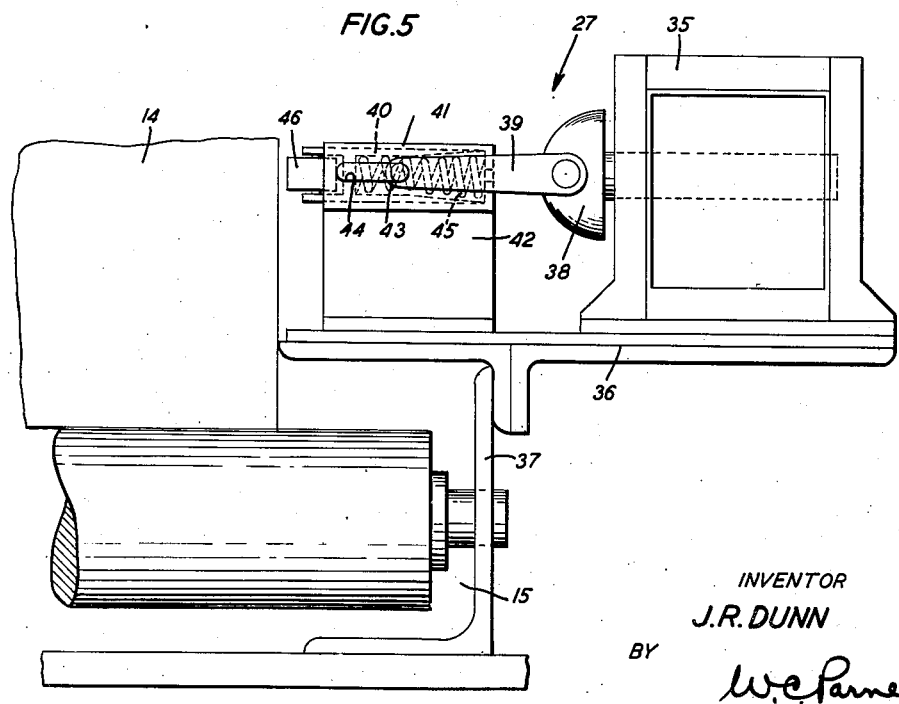
INVENTOR
J. R. DUNN
BY
W. C. Parnell
ATTORNEY Patented May 24, 1949

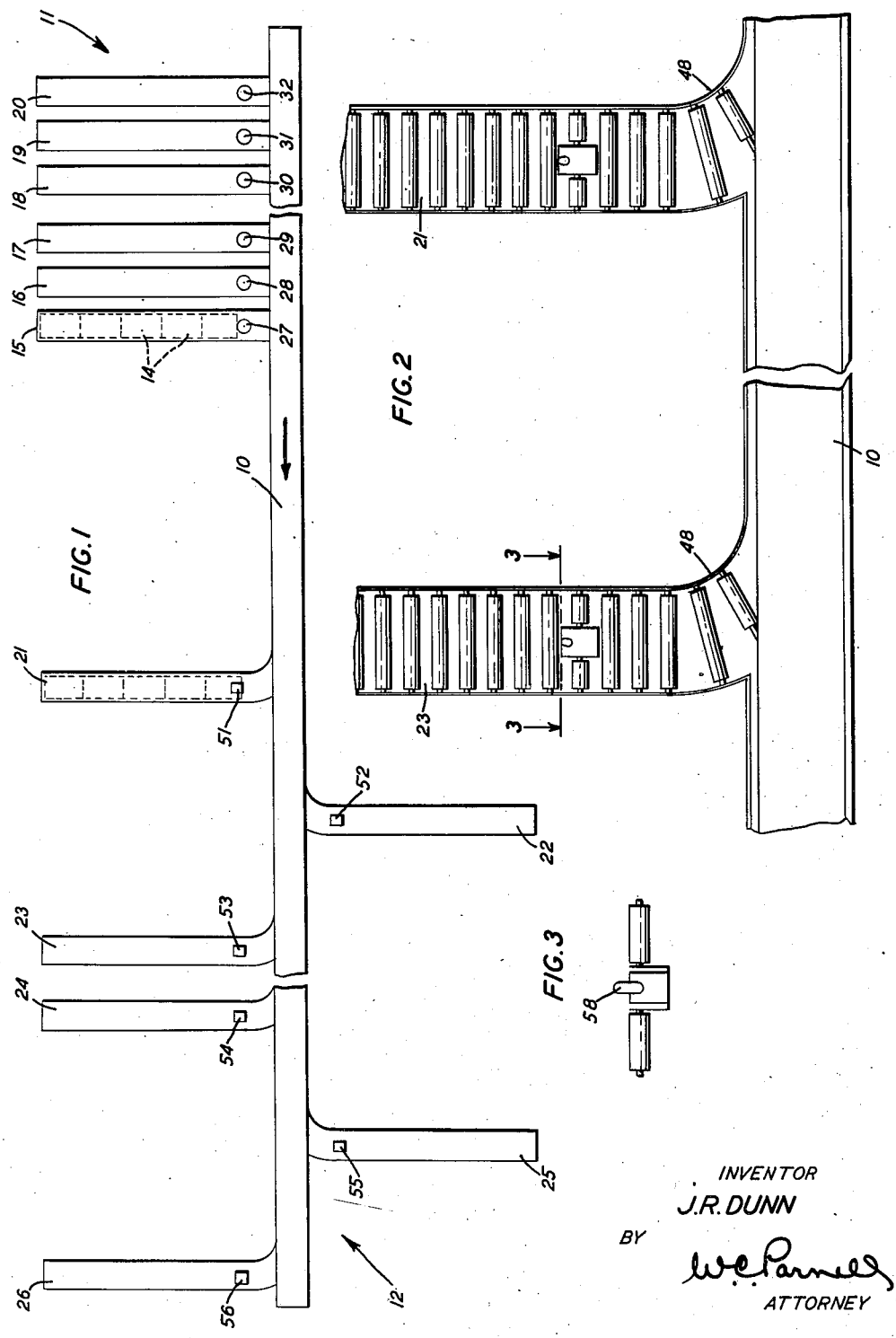

2,470,922

UNITED STATES PATENT OFFICE 2,470,922

WORK DISTRIBUTING CONVEYER SYSTEM

John R. Dunn, South Groveland, Mass., assignor to Western Electric Company, Incorporated, New York, N. Y., a corporation of New York Application September 27, 1946, Serial No. 699,732

3 Claims. (Cl. 198—81)

This invention relates to conveyors and more particularly to conveyors for dispatching containers from a supply station to a work station.

In the manufacture of articles or units which are assembled from materials or piece parts, one of the important factors in production lies in the speed of supplying the material and piece parts to the work stations where the articles or units are to be assembled. It is usually necessary for the work foreman to signal the dispatcher in charge of the supplies when parts or material are required at which time the dispatcher removes the requested work from an area where it is stored and sends it by truck or other transporting means to the work area. With this system, considerable material handling is required and the responsibility of loading the work area with the parts and material required depends largely upon the efficiency of the foreman and the dispatcher.

An object of the invention is to provide a conveyor system which is completely automatic in operation to deliver parts or material from a supply station to anyone of a plurality of work stations.

With this and other objects in view, the invention broadly comprises a main conveyor extending from a supply area through a work area, branch conveyors leading off the main conveyor to spaced work positions, each branch conveyor supporting a given number of articles, and a supply conveyor for each branch conveyor to receive given numbers of articles in the supply area whereby, upon the removal of an article from any one of the branch conveyors, an article will be released from its respective supply conveyor on to the main conveyor to travel to its branch conveyor.

The branch conveyors in the work area slope away from the main conveyor and are of given lengths to hold predetermined numbers of articles or containers thereon. A switch is mounted near the entrance end of each branch conveyor to be operated into open position by the last container, this switch being free to operate into closed position upon removal of the leading container allowing remaining containers to move forwardly. A solenoid operated stop is positioned near the exit end of each of the supply conveyors, each solenoid being under the control of the switch of its respective branch conveyor and electrical circuits including timing units and a selector to dispatch the containers singly without interruption or disturbance by other containers on the main conveyor although a plurality of the switches of the branch conveyors may be operated into closed positions simultaneously.

Other objects and advantages will be apparent from the following detailed description when considered in conjunction with the accompanying drawings, wherein Fig. 1 is a schematic top plan view of the conveyor system;

Fig. 2 is a fragmentary detailed view of the main conveyor and two of the branch conveyors;

Fig. 3 is an enlarged sectional view taken along the line 3—3 of Fig. 2;

Fig. 4 is a schematic illustration of a portion of the conveyor system and the automatic control circuit therefor; and Fig. 5 is a fragmentary sectional view of one of the supply conveyors illustrating the solenoid operated stop therefor.

In the present embodiment, the conveyor system includes a main conveyor 10 which may be composed of a belt continuously driven so that the upper supporting surface travels in the direction of the arrow from a supply area 11 through a work area 12. The supply area may be a part of a storeroom wherein articles, namely, material and parts are stored in pans or containers 14. There will be one supply conveyor for each branch conveyor in the work area. Therefore supply conveyors 15, 16, 17, 18, 19 and 20 are to receive pans with parts or material to be conveyed to their respective branch conveyors 21, 22, 23, 24, 25 and 26. The supply conveyors 15 to 20, inclusive, may be of the gravity feed type including rollers, the conveyors sloping toward the main conveyor 10 so that each pan will, when released, travel toward and onto the main conveyor. The circles near the exit ends of the supply conveyors and identified by reference numerals 27 to 32, inclusive, represent solenoid operated stops shown in detail in Fig. 5. These stops are identical in construction, therefore a description of the stop 27 shown in Fig. 5 will apply to each of the other stops 28 to 32, inclusive. The stop 27 includes a solenoid 35 mounted upon a bracket 36 supported by the frame 37 of the conveyor 15. The core 38 of the solenoid is connected by links 39 to a piston-like member 40 disposed in a cylinder 41 of a bracket 42. Pins 43 connecting the links 39 to the piston 40 extend through elongate apertures 44 in the sides of the piston or bracket. A spring 45 normally urges the piston forwardly so that a roller 46 carried by the leading end thereof will extend into the path of the pans to normally hold all of the pans on the conveyor 15 against movement. Energization of the solenoid 35 will move its core 38 into the position shown against the force of the spring 45 to move the roller 46 out of the path of the pans, the roller being capable, upon deenergization of the solenoid to ride along the adjacent side of the first pan and stop the second pan and the other pans behind it from moving on to the main conveyor.

The branch conveyors 21 to 26 inclusive, slope away from the main conveyor 10 and curve into the main conveyor as illustrated at 48. Normally closed switches 51, 52, 53, 54, 55 and 56 are mounted in their respective branch conveyors near the entrance ends thereof and include projections 58 which normally extend above the branch conveyors and in the path of the pans 14 so that the switches will be operated into the open positions by the pans resting thereon.

Attention is now directed to Fig. 4 which illustrates the automatic control system. Supply lines 60 and 61 for electrical energy are provided for the automatic circuit control system. The switches 51 to 56, inclusive, only switches 51 and 53 being shown in this figure, are connected to their respective contacts of a selector segment 62. A brush or pointer contact 63 for the selector is indexed step by step continuously from contact to contact on selector segment 62 in a given direction, for example, clockwise by its winding 64. The time period of the indexing of pointer contact 63 is controlled by timer 71, the circuit for which is completed from line 60 at connection 72, through the winding 64, the timing unit 71, to line 61 at connection 73. When one of the switches 51 to 56, inclusive, is closed by the removal of a pan from its branch conveyor, a circuit is completed from line 60 through a time control unit 65, contact pointer 63 and its contact in the segment, when the pointer moves into engagement therewith. If switch 51 is closed the circuit will be completed through the pointer 63, line 68, switch 51, solenoid 35 of the unit 27 to line 61.

The principal function of timing unit 65, which may be of variable type, is to limit the time the circuits through any of the solenoid operable stops 27 to 32, inclusive, are closed, thus controlling the number of containers 14 which are allowed to leave their respective supply conveyors during each feeding operation. The function of the timing unit 71 is to control the time the circuit through winding 64 is closed and in turn control the indexing of pointer 63 from contact to contact. This controls the time interval between the release of pans from each supply conveyor identified by reference numbers 15 to 20, inclusive, and prevents jamming of the main belt as well as provide sufficient time for pans released from supply conveyors 15 to 20, inclusive, to travel on the main belt 10 to their respective branch conveyors 21 to 26, inclusive, open respective switches 51 to 56, inclusive, before the pointer contact 63 has indexed to the same contact on selector segment 62. As an example, if a pan of work is released from branch conveyor 21, switch 51 will be closed and when pointer 63 indexes to the corresponding contact the circuit through solenoid unit 27 will be closed releasing a container 14 from supply conveyor 15. Timer 71 so controls the indexing of pointer 63 that container 14 will travel the main belt 10, enter branch conveyor 21, and open switch 51 before pointer 63 has made a complete cycle and returned to the contact on segment 62 connected to switch 51 through line 68. This assures that an identical number of containers 14 will be released from supply conveyor 15 as removed from branch conveyor 21.

Timers 71 and 65 are connected through line 70 so that timer 65 operates solenoid units 27 through 32 inclusive, only when pointer 63 is in a stationary position and in contact with individual contacts on segment 62. The detailed structures of timing units 65 and 71 are not shown as these timing units are commercially known structures.

During the operation of the conveyor system, the operator located in the supply area knows what parts and materials are needed at the various stations in the work area. All that he is required to do, therefore, is to keep the supply conveyors filled with containers or pans 14 of the necessary supplies on the conveyors 15 to 20, inclusive, for their respective work area conveyors 21 to 26, inclusive. This function is not a part of the operation of the conveyor system. The conveyor system is completely automatic in operation, requiring no communication between persons in the work area and those in the supply area.

When the leading container 14 is removed from one of the conveyors in the work area, the remaining containers on that conveyor advance, releasing the associated switch for movement into closed position. As an example, let it be assumed that a container was removed from conveyor 23 and that immediately thereafter, or simultaneously therewith, a container was removed from conveyor 21. This action will cause switches 53 and 51, respectively, to be operated into closed positions. The circuits in which the switches are disposed are not closed upon closing of the switches, but are conditioned to be closed depending upon the function of the selector 62. During this time, the brush or pointer 63 of the selector is moving relative to the contacts for the various control circuits. The first contact of the group of circuits conditioned to be closed upon the closing of their switches in the work area, will be completed when the pointer 63 engages its respective contact in the selector. At this time, a circuit will be completed through the timing unit 65, the pointer 63, the contact for the switch 53 completing a circuit through the solenoid of the stop 29 operating the solenoid for the conveyor 16 into open position to free a given number of containers 14 for movement, by gravity, off the conveyor 16 and on to the main conveyor 10. The interval of time this circuit remains closed depends upon the setting of the timing unit 65 for controlling the number of containers 14 allowed to pass from the supply conveyor on to the main conveyor.

As a rule, only one container is freed at one time and the switches 51 to 56 on the work conveyors are positioned with respect to the entrance ends thereof to allow the given number of containers to enter the work conveyors. It may be desirable, however, to allow two or more containers to move at one time from their supply conveyors on to the main conveyor and eventually on to their respective work conveyors. In this instance, the switches 51 to 56, inclusive, will be positioned so that after their work conveyors have been filled, they will not be free to operate into closed positions until the chosen number of containers have been removed from their conveyors.

Returning again to the suggested illustration of the simultaneous removal of containers from the conveyors 21 and 23, it has been pointed out that the brush or pointer 63 will complete or close the first circuit whose contact it reaches in its circular travel. In the present illustration, the circuit through the switch 53 and the solenoid of the stop 28 have been completed freeing, for example, one container from the conveyor 16. If only one container is to be freed, the timing unit 65 is set so that after a definite length of time the solenoid of the stop 28 will be deenergized, freeing the spring 45 to move its roller 46 into engagement with the side of the container leaving the conveyor 16 and ride thereon until it is free to move in front of the next container to stop it and the remaining containers on the conveyor 16 against movement toward the conveyor 10.

The circuit operating the timing unit 71 to close the circuit through the winding 64 is open during the operation of the first circuit and remains opened to hold the selector unoperated for a given length of time which is sufficient, for example, for a given number of containers, all that are to be freed at one time, to pass from the supply conveyor 20 on to the main conveyor 10 and move beyond the supply conveyor 15. The purpose of this time controlled operation is to eliminate disturbance of containers piling up on the main conveyor or blocking of the travel of the containers, which would occur, for example, if a container should be freed from the conveyor 15 during the travel of a container from any of the other conveyors on the conveyor 10 in the vicinity of the conveyor 15, while the container therefrom is moving on to the conveyor 10.

After this interval of time has lapsed, the timing unit 71 will operate to again complete the circuit through the winding 64 to cause movement of the brush or pointer 63 to find the next contact of the circuit which is to be closed, namely, the circuit including the switch 51. The same series of functions takes place at this time in their respective order. In other words, when pointer 63 indexes to the corresponding contact on selector 62, timer 71 clears timer 65 to operate through line 70, circuit is completed through the timing unit 65, the brush 63, the switch 51 and its solenoid 35 of the stop 27. The roller 46 of the stop 27 will be moved free of the first container on the conveyor 15, allowing the first container to pass on to the conveyor 10, the solenoid being deenergized, however, through the control of the timing unit 65 to effect stopping of the remaining containers on the conveyor 15. The timing unit 71 will again function at this time to keep open the circuit through the winding 64, holding the brush on the main circuit just completed, until the container from the conveyor 15 has moved on to the conveyor 10. In each instance, when the container or containers from the conveyors in the supply area have moved on to their respective branch conveyors in the work area, their switches in the branch conveyors have been opened holding these circuits against operation until the leading containers thereon have been removed.

Any conventional means may be employed to divert the containers from the main conveyor 10 on to their respective branch conveyors in the work area. In other words, the containers which are disposed upon the supply conveyors have deflecting means such as pins disposed at varied positions on the leading ends of the containers which are to be engaged by deflecting arms or other suitable means at their respective branch conveyors in the work area. Many control features of this type are well known in the art and as this is not a part of the present invention, detailed structures thereof have not been embodied in this application.

Although specific improvements of the invention have been shown and described, it will be understood that they are but illustrative and that various modifications may be made therein without departing from the scope and spirit of this invention as defined by the appended claims.

What is claimed is:

1. A conveyor system for dispatching articles from a supply area to a work area, the conveyor system comprising a driven main conveyor having a conveying surface travelling from the supply area through the work area, branch conveyors disposed at spaced positions in the work area and positioned to receive articles from the main conveyor, supply conveyors for the branch conveyors disposed at spaced positions in the supply area and positioned to feed articles disposed thereon to the main conveyor, electrically operable units for each supply conveyor to release a given number of the articles for movement onto the main conveyor, an electrical circuit for each unit, a normally closed switch for each circuit disposed at its respective branch conveyor to be held open by articles on the branch and freed to close by the removal of a given number of articles from the branch conveyor, and a selector operable to render the circuits effective in a given order.

2. A conveyor system for dispatching articles from a supply area to a work area, the conveyor system comprising a driven main conveyor having a conveying surface travelling from the supply area through the work area, branch conveyors disposed at spaced positions in the work area and positioned to receive articles from the main conveyor, supply conveyors for the branch conveyors disposed at spaced positions in the supply area and positioned to feed articles disposed thereon to the main conveyor, electrically operable units for each supply conveyor to release a given number of the articles for movement onto the main conveyor, an electrical circuit for each unit, a normally closed switch for each circuit disposed at its respective branch conveyor to be held open by articles on the branch and freed to close by the removal of a given number of articles from the branch conveyor, a selector operable to render the circuits effective in a given order, and a timing unit to hold the selector unoperated until the lapse of a given interval of time after the closing of one circuit before the next circuit may be closed.

3. A conveyor system for dispatching articles from a supply area to a work area, the conveyor system comprising a driven main conveyor travelling from the supply area through the work area, branch conveyors disposed at spaced positions in the work area and positioned to receive articles from the main conveyor, supply conveyors for the branch conveyors disposed at spaced positions in the supply area and positioned to feed articles disposed thereon to the main conveyor, retaining units, for the supply conveyors normally urged into the path of the articles thereon, electrically operable to release a given number of articles for movement onto the main conveyor, an electrical circuit for each unit, a normally closed switch for each circuit disposed at its respective branch conveyor to be held open by articles on the branch conveyor and freed to close by the removal of a given number of articles from the branch conveyor, a selector having a contact for each circuit and a brush operable successively into engagement with the contacts to render the circuits effective in a given order, and a timing unit to hold the brush of the selector unoperated until the lapse of a given interval of time after the closing of one circuit by the brush engaging its contact before the next circuit may be closed by the brush.

JOHN R. DUNN.

REFERENCES CITED

The following references are of record in the file of this patent:

UNITED STATES PATENTS

| Number | Name | Date |
|---|---|---|
| 2,353,638 | Beaulieu et al. | July 18, 1944 |